Patented Oct. 14, 1941

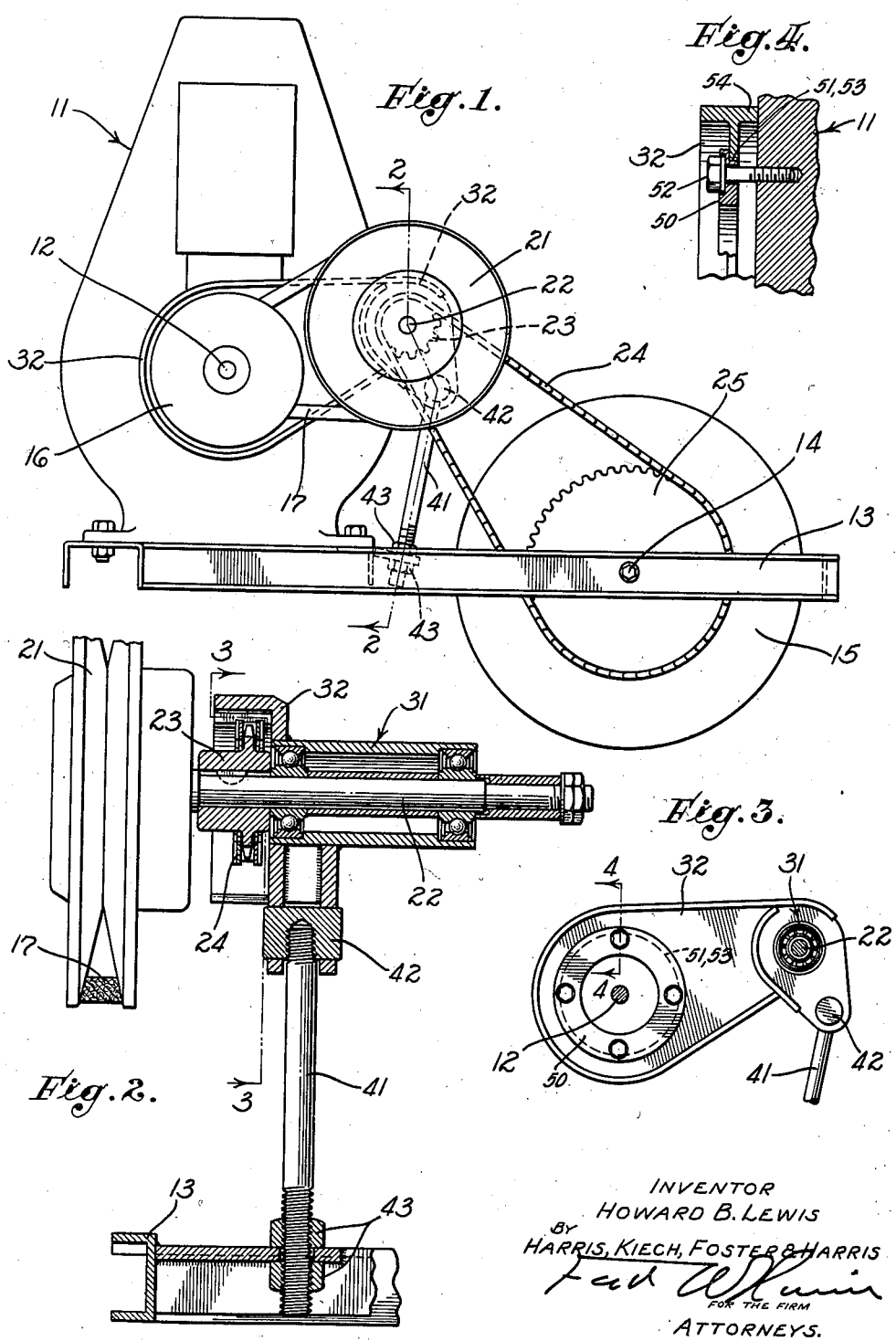

2,258,778

UNITED STATES PATENT OFFICE 2,258,778

CHAIN ADJUSTMENT

Howard B. Lewis, Venice, Calif., assignor to Salsbury Corporation, Inglewood, Calif., a corporation of California Application September 30, 1940, Serial No. 359,060

3 Claims. (Cl. 180—70)

My invention relates to a power transmission which may be used to drive light vehicles by means of an internal combustion engine. Such vehicles are commonly driven by one or more driving wheels which are actuated by the engine through a suitable transmission.

My invention has a special utility when used in such a transmission. Such transmissions are usually provided with a countershaft between the engine and the wheel, this countershaft being driven from the engine shaft by a primary transmission such as gears, pulleys and a belt, or sprockets and a chain. The countershaft then drives the wheel through a secondary transmission which usually consists of a driving sprocket on the countershaft and driven sprocket on the wheel, these sprockets being connected by a chain. It is an object of my invention to provide means for adjusting the distance between the axis of the wheel and the axis of the countershaft so that the chain can be initially given the proper tension and this distance can be increased to compensate for chain wear.

In the drawing, which illustrates a preferred form of my invention:

Fig. 1 is a side elevational view of my device;

Fig. 2 is an enlarged vertical section taken on the line 2—2 of Fig. 1;

Fig. 3 is an elevational view of the adjustable arm on a reduced scale taken on the line 3—3 of Fig. 2;

Fig. 4 is an enlarged fragmentary section taken on the line 4—4 of Fig. 3.

In the drawing, 11 is the engine having an engine shaft 12. The engine is mounted on a frame 13 which is supported by the axle 14 of a wheel 15. Keyed or otherwise secured on and to rotate with the shaft 12 is a primary pulley 16. This pulley is preferably of the V-belt type and drives a V-belt 17 which in turn drives a secondary pulley 21 which is keyed or otherwise secured on and to rotate with a countershaft 22. Also secured on and to rotate with the countershaft 22 is a primary sprocket 23 which drives a chain 24 which in turn drives a secondary sprocket 25 which is carried on the axle 14 or otherwise secured to and drives the wheel 15.

The countershaft 22 is carried in a bearing 31 which is carried on an arm 32 which is pivoted on the engine 11 or engine shaft 12 so that it can be rotated about the center of the shaft 12. The angular position of the arm 32 about this center can be adjusted with relation to the frame 13 by means of a bolt 41 which is pivoted at its upper end on a pin 42 carried in the arm 32, and which is clamped to the frame 13 by two nuts 43.

By varying the position of the nuts 43 on the bolt 41, the effective length of the bolt 41 between the pin 42 and the frame 13 can be adjusted and the arm 32 turned about the axis of the shaft 12 to raise or lower the countershaft 22 with relation to the frame 13. As the countershaft 22 is raised the distance between the axis of the countershaft 22 and the axis of the axle 14 is increased and the chain 24 is tightened, and by lowering the pin 42 the chain is loosened.

A convenient method of securing the arm 32 to the engine so that it can be rotated about the engine shaft 12 as a center is shown in Fig. 3 and Fig. 4. A plate 50 having a bearing 51 is secured to the side of the engine by four bolts 52. The arm 32 has a bore 53 which fits over the bearing 51, thus centering the plate 50. When the bolts 52 are tightened, the plate 50 presses a flange 54 against the engine.

I claim as my invention:

1. In a vehicle, having a main frame, a driving wheel, and an engine mounted on said frame, mechanism through which said engine drives said wheel comprising: a primary pulley rigidly secured to the shaft of said engine; an arm secured to said engine in such a manner that it can be rotated about the axis of said engine shaft; a countershaft turning in bearings carried on the movable end of said arm; a secondary pulley secured to said countershaft; a belt connecting said pulleys and through which power is transmitted from said primary pulley to said secondary pulley; a primary sprocket secured to said countershaft; a secondary sprocket driving said wheel; a chain connecting said sprockets and through which said power is transmitted from said primary sprocket to said secondary sprocket; and a member of adjustable length connecting said arm with said frame in such a manner that the position of the arm may be adjusted to regulate the distance between the centers of said sprockets.

2. In a vehicle, having a main frame, a driving wheel, and an engine mounted on said frame, mechanism through which said engine drives said wheel comprising: a primary pulley rigidly secured to the shaft of said engine; an arm secured to said engine in such a manner that it can be rotated about the axis of said engine shaft; a countershaft turning in bearings carried on the movable end of said arm; a secondary pulley secured to said countershaft; a belt connecting said pulleys and through which power is transmitted from said primary pulley to said secondary pulley; a primary sprocket secured to said countershaft; a secondary sprocket driving said wheel; a chain connecting said sprockets and through which said power is transmitted from said primary sprocket to said secondary sprocket; a pin carried by said arm; a bolt pivoted on said pin; and a nut fixed on said frame into which said bolt is threaded for regulation of the spacing between the centers of said sprockets.

3. In a vehicle, having a main frame, a driving wheel, and an engine mounted on said frame, mechanism through which said engine drives said wheel comprising: a primary pulley rigidly secured to the shaft of said engine; an arm secured to said engine in such a manner that it can be rotated about the axis of said engine shaft; a countershaft turning in bearings carried on the movable end of said arm; a secondary pulley secured to said countershaft; a belt connecting said pulleys and through which power is transmitted from said primary pulley to said secondary pulley; a primary sprocket secured to said countershaft; a secondary sprocket driving said wheel; a chain connecting said sprockets and through which said power is transmitted from said primary sprocket to said secondary sprocket; a bolt connecting said arm with said frame, the center line of said bolt being tangent to an arc struck about the center of said engine shaft; and means for adjusting the effective length of said bolt in such a manner that the position of the arm may be adjusted to regulate the distance between the centers of said sprockets.

HOWARD B. LEWIS.